(12) United States Patent
Mevius et al.

(10) Patent No.: US 11,005,246 B2
(45) Date of Patent: May 11, 2021

(54) MOUNTING FOOT FOR ELECTRICAL ENCLOSURE AND ELECTRICAL ENCLOSURE INCLUDING THE SAME

(71) Applicant: Eaton Intelligent Power Limited, Dublin (IE)

(72) Inventors: Jason S. Mevius, McKinney, TX (US); Timothy Alan Garbacik, Collinsville, TX (US); Timothy Joseph Sloan, McKinney, TX (US)

(73) Assignee: Eaton Intelligent Power Limited, Dublin (IE)

( * ) Notice: Subject to any disclaimer, the term of this patent is extended or adjusted under 35 U.S.C. 154(b) by 120 days.

(21) Appl. No.: 16/154,482

(22) Filed: Oct. 8, 2018

(65) Prior Publication Data

US 2019/0109442 A1 Apr. 11, 2019

Related U.S. Application Data

(60) Provisional application No. 62/569,278, filed on Oct. 6, 2017.

(51) Int. Cl.
| | |
|---|---|
| *H02G 3/08* | (2006.01) |
| *H02B 1/06* | (2006.01) |
| *H02B 1/14* | (2006.01) |
| *H02B 1/44* | (2006.01) |
| *H02B 1/40* | (2006.01) |

(52) U.S. Cl.
CPC ............... *H02G 3/08* (2013.01); *H02B 1/066* (2013.01); *H02B 1/14* (2013.01); *H02B 1/44* (2013.01); *H02B 1/40* (2013.01)

(58) Field of Classification Search
CPC ...... H02G 3/08; H02G 3/081; H02G 3/10; H02G 3/12; H02G 3/121; H01R 13/46; H05K 5/00; H05K 5/02; H02B 1/066; H02B 1/14; H02B 1/44; H02B 1/40
USPC ....... 174/480, 481, 50, 53, 57, 58, 520, 535, 174/559, 562, 54, 63; 220/3.2–3.9, 4.02; 248/906
See application file for complete search history.

(56) References Cited

U.S. PATENT DOCUMENTS

| | | | | |
|---|---|---|---|---|
| 3,187,084 A | * | 6/1965 | Stillman | .................. H02G 3/10 174/58 |
| 3,197,548 A | * | 7/1965 | Weitzman | ................ H02G 3/10 174/58 |
| 3,659,036 A | * | 4/1972 | Silver | ...................... H02G 3/10 174/58 |
| 4,328,903 A | * | 5/1982 | Baars | ....................... H02G 3/10 174/58 |

(Continued)

*Primary Examiner* — Angel R Estrada
(74) *Attorney, Agent, or Firm* — Stinson LLP

(57) ABSTRACT

An electrical enclosure for an electrical device or instrument includes an enclosure body defining an interior that receives the electrical device or instrument, the enclosure body including a back wall. A mounting foot is disposed outside the enclosure body and attached to the back wall. The mounting foot includes a generally planar body defining a mounting fastener opening that receives a fastener to secure the mounting foot to a wall or other support structure. A panel fastener is attached to and extends forward from the mounting foot, through the back wall, and into the interior of the enclosure body. The panel fastener is used to secure an internal panel to the enclosure body within the interior of the enclosure body.

19 Claims, 14 Drawing Sheets

(56) References Cited

U.S. PATENT DOCUMENTS

| | | | | |
|---|---|---|---|---|
| 4,908,733 A * | 3/1990 | Zachrei | .................... | H02B 1/40 |
| | | | | 220/3.3 |
| 5,349,134 A * | 9/1994 | Russell | .................... | H02G 3/10 |
| | | | | 174/53 |
| 5,550,322 A * | 8/1996 | Tynan | .................... | H02G 3/123 |
| | | | | 174/502 |
| 5,571,993 A * | 11/1996 | Jones | .................... | H02G 3/185 |
| | | | | 174/57 |
| 6,733,345 B2 * | 5/2004 | Weise | .................... | H01R 9/24 |
| | | | | 174/50 |

\* cited by examiner

MOUNTING FOOT FOR ELECTRICAL ENCLOSURE AND ELECTRICAL ENCLOSURE INCLUDING THE SAME

CROSS-REFERENCE TO RELATED APPLICATIONS

The present application claims the benefit of U.S. Provisional Application No. 62/569,278, filed Oct. 6, 2017, the entirety of which is hereby incorporated by reference.

FIELD OF THE DISCLOSURE

The present disclosure generally relates to a mounting foot for an electrical enclosure and an electrical enclosure including the mounting foot.

BACKGROUND OF THE DISCLOSURE

An electrical enclosure may be used to house electrical controls and instruments, for example. Such electrical enclosures may be used as electrical junction boxes, terminal wiring boxes, and instruments housing, and provide a degree of protection against dust, dirt, spraying of water, oil, and noncorrosive liquids.

An example of a conventional electrical enclosure is generally indicated at reference numeral 10 in FIGS. 1-3. The conventional electrical enclosure 10 comprises an enclosure body defining an interior for receiving the electrical control or instrument or other electrical device. The enclosure body has a back wall 12, left and right side walls 14, 16, a top wall 18, and a bottom wall 20. A front side of the enclosure body is open, and a door 22 is hingedly attached adjacent to the front side for opening and closing the enclosure body. The door 22 is secured in the closed position by a latch or clamp 24 on the enclosure body. The door 22 may include a gasket or seal 26 for sealing with the front side of the enclosure body when the door is closed.

Upper and lower mounting feet 30A, 30B are welded to the exterior of the back wall 12 of the enclosure body. The upper and lower mounting feet 30A, 30B define mounting openings 32A, 32B for receiving fasteners (e.g., bolts or screws or other fasteners) to secure the electrical enclosure 10 to a wall or other support structure. Four panel mounting studs 34 are welded to the interior of the back wall 12 of the enclosure body. The panel mounting studs 34 are internally threaded (i.e., include female threads). A mounting panel (not shown) is fastened to the studs 34 in a location spaced apart from the interior of the back wall 12 by threading fasteners (e.g., screws or bolts) through the mounting panel and into the studs.

SUMMARY OF THE DISCLOSURE

In one aspect, a mounting foot for an electrical enclosure for an electrical device or instrument is described. The electrical enclosure may include an enclosure body defining an interior sized and shaped to receive the electrical device or instrument. The enclosure body includes a back wall. The mounting foot is outside the enclosure body and attached to the back wall of the enclosure body. The mounting foot includes a generally planar body defining a mounting fastener opening configured to receive a fastener to secure the mounting foot to a wall or other support structure. A panel fastener is attached to and extends forward from the mounting foot, through the back wall, and into the interior of the enclosure body. The panel fastener is configured to be used in securing an internal panel to the enclosure body within the interior of the enclosure body.

In another aspect, an integrated enclosure/panel mounting system for an electrical enclosure for an electrical device or instrument is described. The integrated enclosure/panel mounting system may include a mounting foot having a generally planar body defining a mounting fastener opening configured to receive a fastener to secure the mounting foot to a wall or other support structure. The integrated enclosure/panel mounting system may also include a panel fastener extending from the mounting foot and configured to pass through a back wall of the electrical enclosure and into an interior of the electrical enclosure. The panel fastener is configured to be used in securing an internal panel to the enclosure body within the interior of the electrical enclosure.

DETAILED DESCRIPTION OF THE DISCLOSURE

Figure 1:
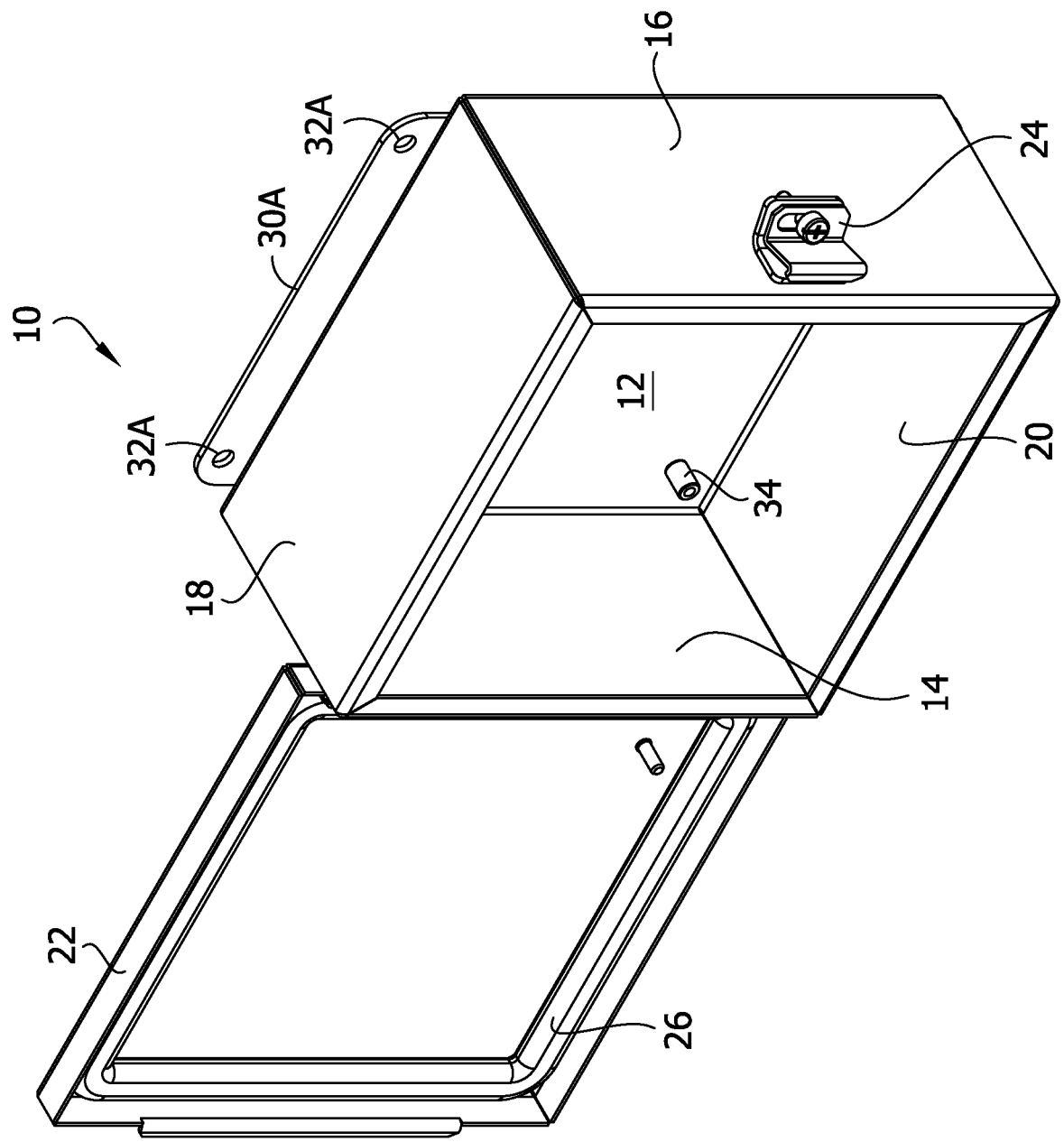
FIG. 1 is a perspective of a conventional electrical enclosure.
Figure 2:
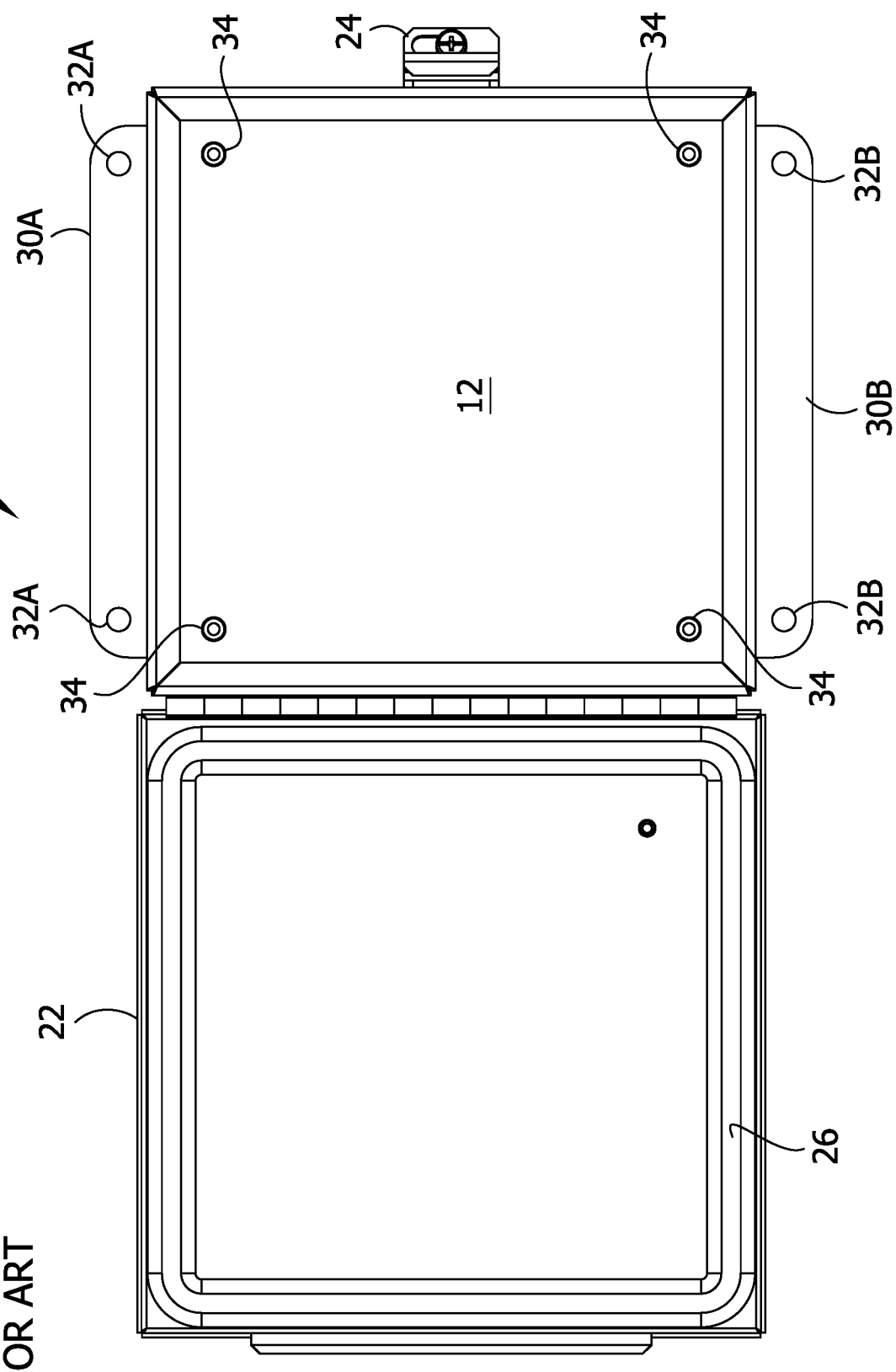
FIG. 2 is a front elevational view of the conventional electrical enclosure.
Figure 3:
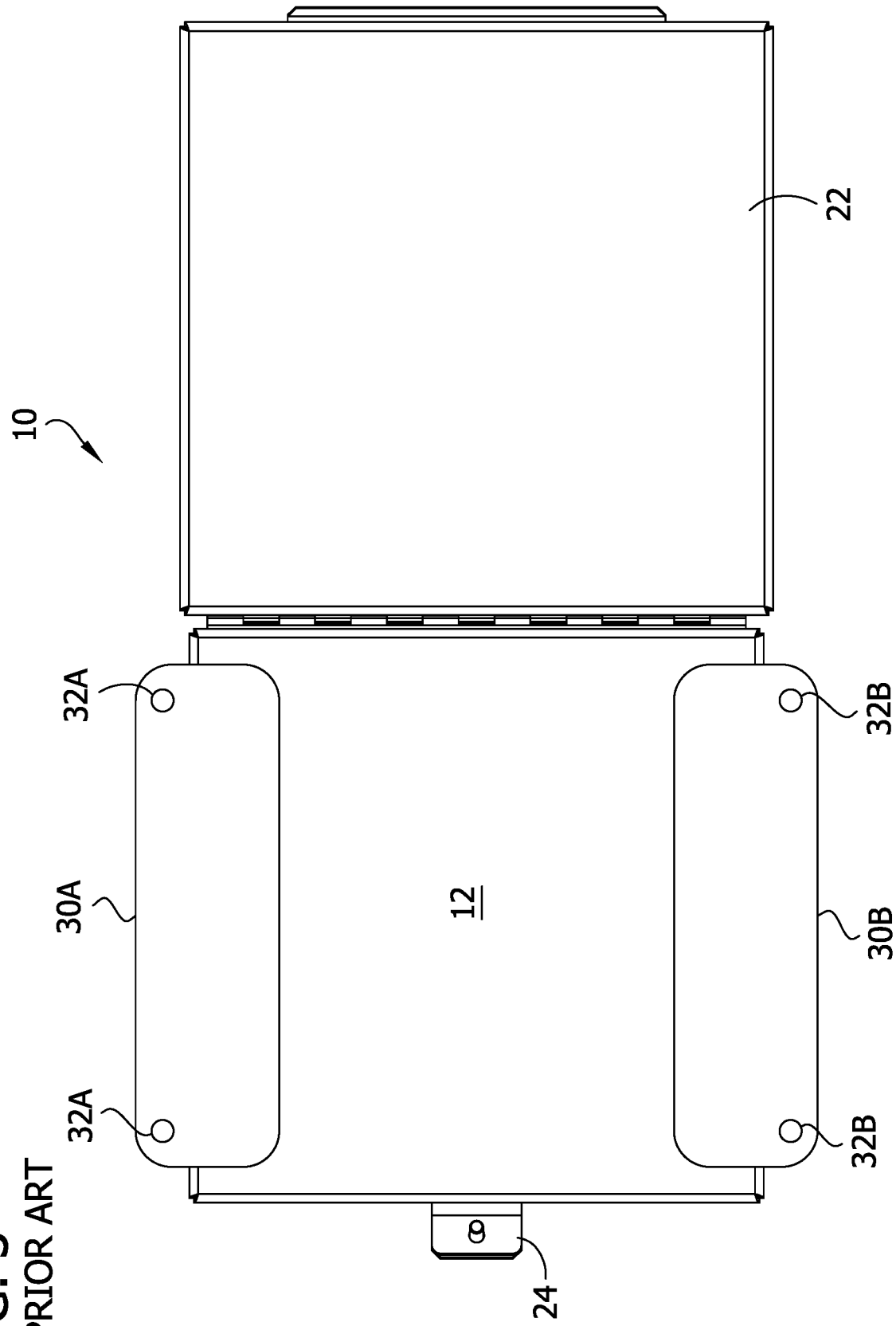
FIG. 3 is a rear elevational view of the conventional electrical enclosure.
Figure 4:
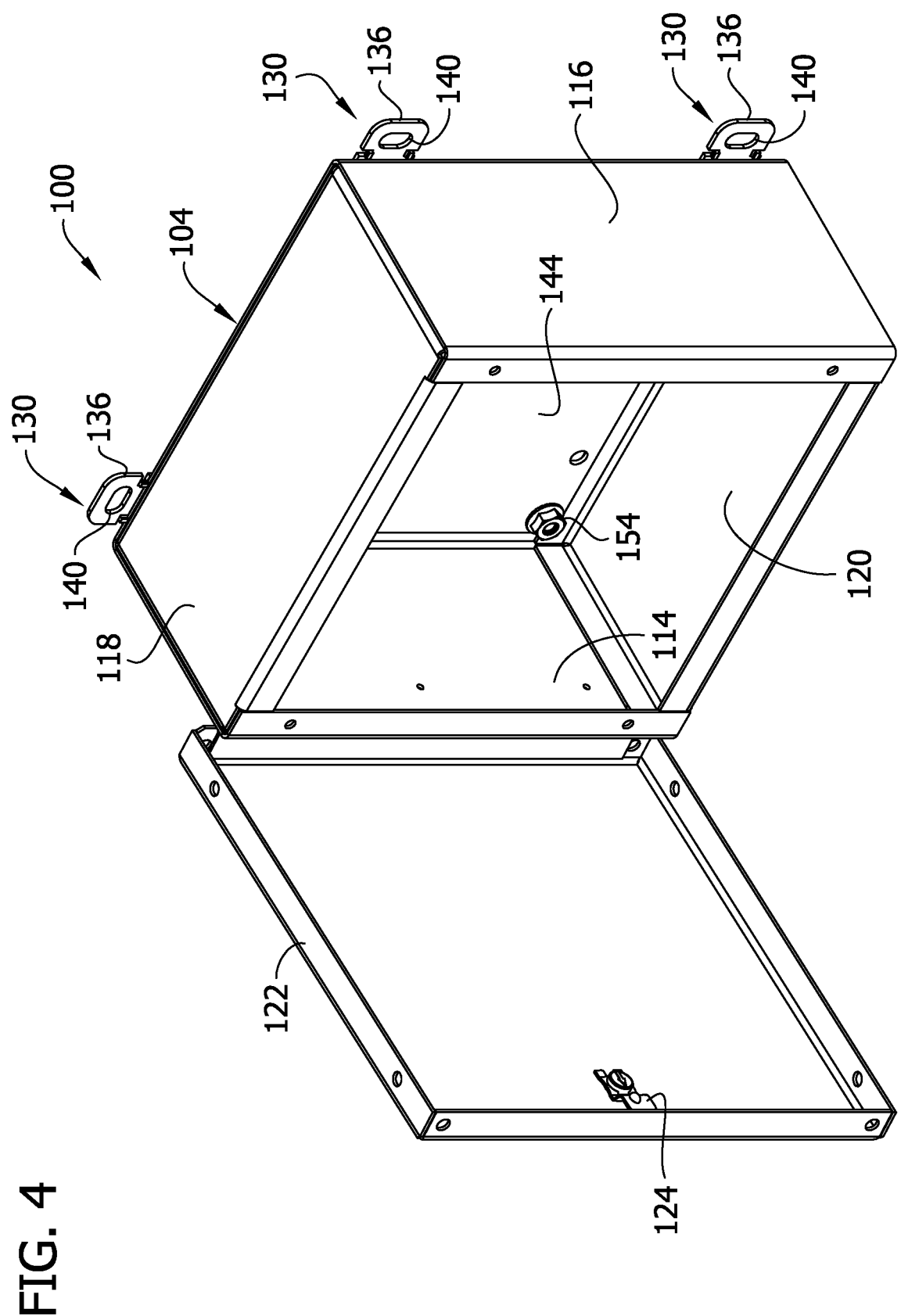
FIG. 4 is a perspective of one embodiment of an electrical enclosure constructed according to the teachings of the present disclosure.
Figure 5:
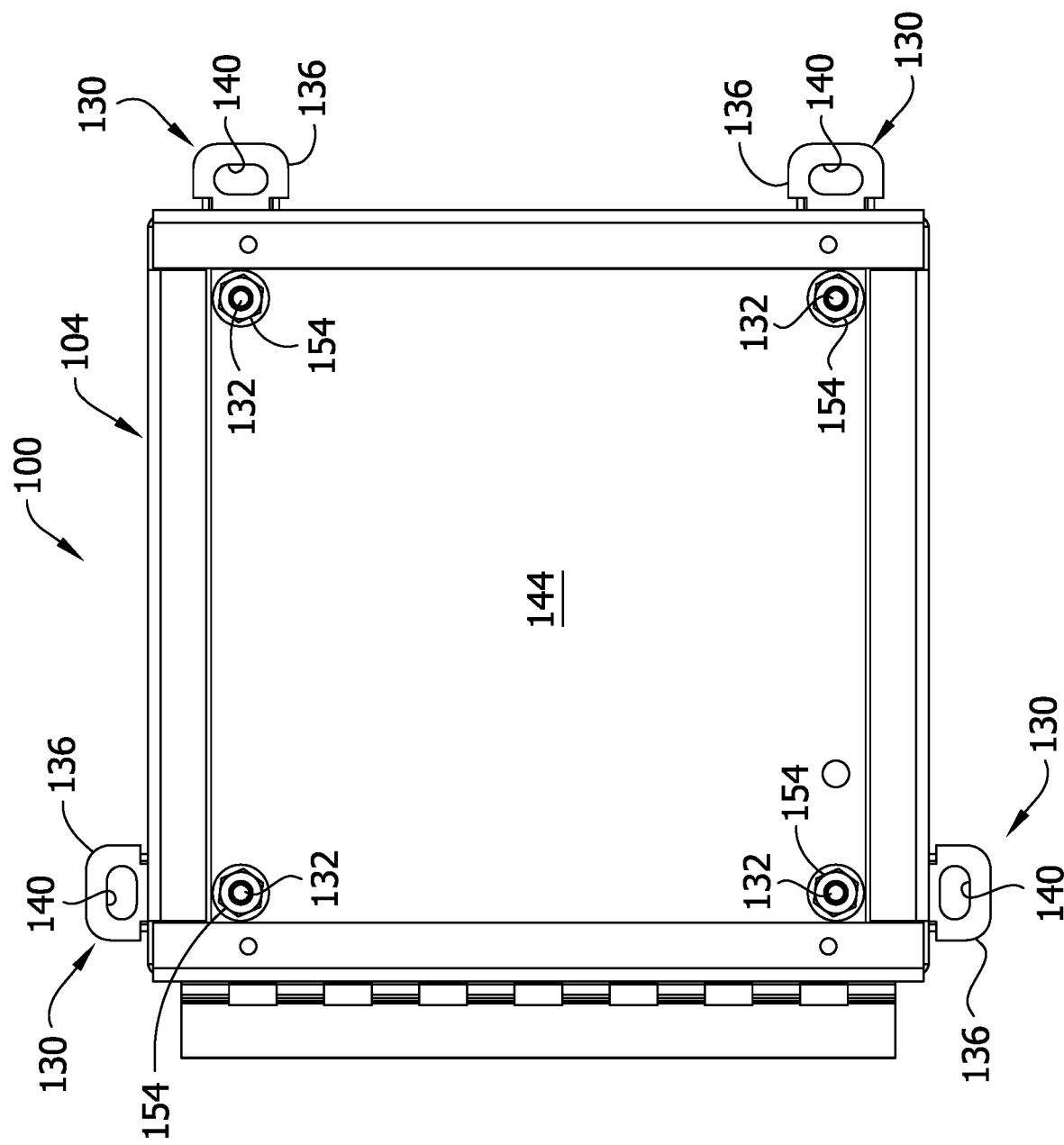
FIG. 5 is a front elevational view of the electrical enclosure of FIG. 4, with the door removed for ease of illustration.
Figure 6:
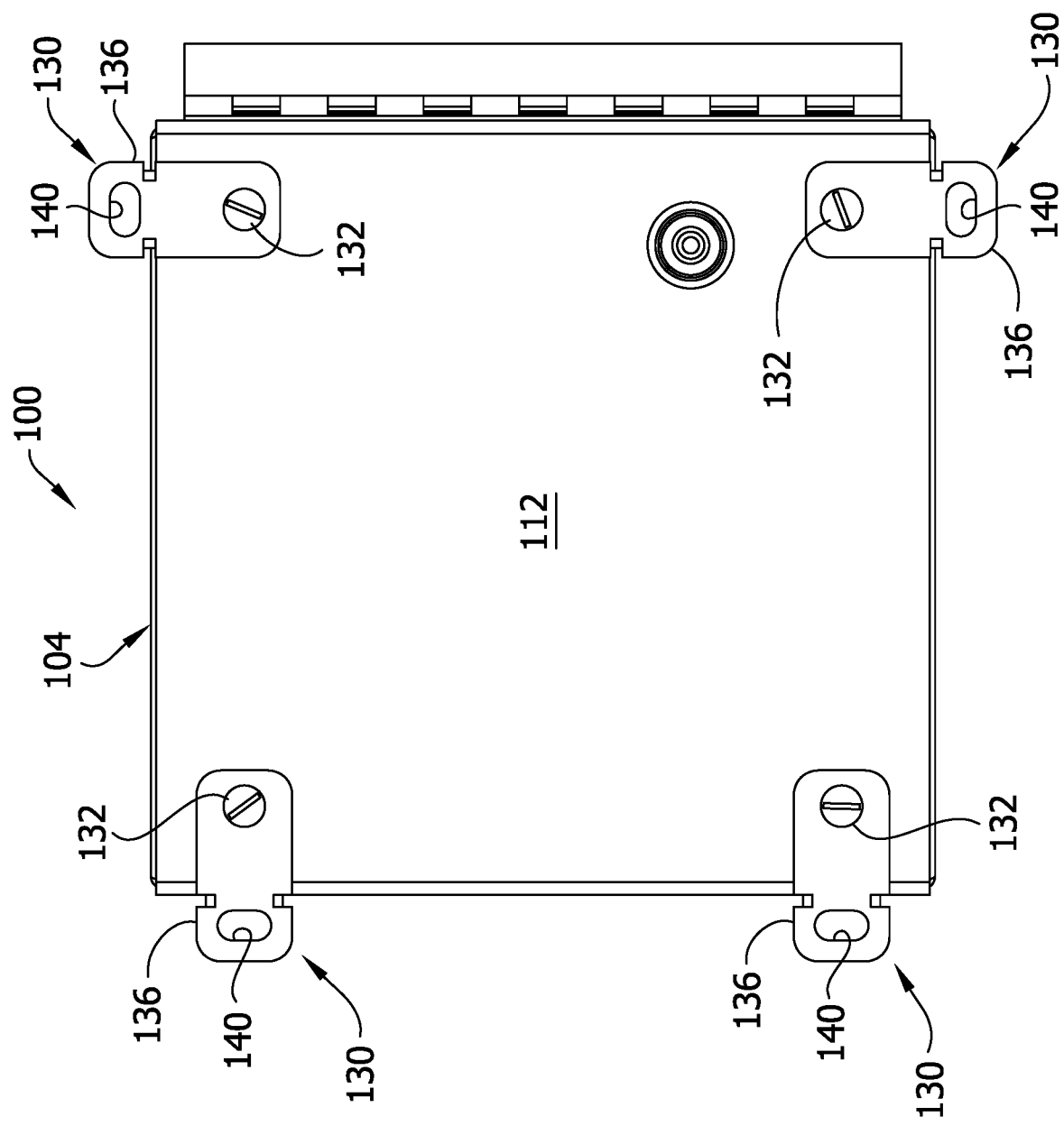
FIG. 6 is a rear elevational view of the electrical enclosure of FIG. 4, with the door removed for ease of illustration.

Referring to FIGS. 4-6, one embodiment of an electrical enclosure constructed according to the teachings of the present disclosure is generally indicated at reference numeral 100. In general, the electrical enclosure 100 includes an improved enclosure mounting system and an improved panel mounting system, as explained in more detail below. In particular, the enclosure mounting system and internal panel mounting system may be integrated into an enclosure/panel mounting system, as illustrated.

Referring still to FIGS. 4-6, the electrical enclosure 100 comprises an enclosure body, generally indicated at 104, defining an interior sized and shaped to receive the electrical control or instrument or other device therein. The enclosure body 104 has a back wall 112, left and right side walls 114, 116, a top wall 118, and a bottom wall 120. As used herein, terms denoting relative locations and positions of components and structures of the electrical enclosure 100, including but not limited to "upper," "lower," "left," "right," "front," and "rear," are in reference to the orientation of the electrical enclosure as shown in FIG. 4 and should not construed in a limiting sense. The enclosure body 104 may be formed from metal or other suitable material. A front side of the enclosure body is open to the interior, and a door 122 is hingedly attached adjacent to the front side so that the door is capable of opening and closing to allow access to the interior and inhibit access of the interior, respectively. The door 122 is secured in the closed position by a latch 124 on the door and/or the enclosure body 104. It is understood that the door may be of other configurations and the electrical enclosure may be opened and closed in other ways. The door 122 may include a gasket or seal (not shown), similar to the conventional door 22, for sealing with the front side of the enclosure body 104 when the door is closed. The door 122 may be formed from metal or other material. The enclosure body 104 and/or the door 122 may be of other configurations without necessarily departing from the scope of the present disclosure.

The enclosure/panel mounting system includes mounting feet, each generally indicated at reference numeral 130, and panel fasteners 132 (e.g., four panel fasteners) extending from the mounting feet and into the interior of the enclosure body 104. The mounting feet 130 are designed and constructed to be used in securing the enclosure 100 to a wall or other support structure. The panel fasteners 132 are designed and constructed to be used in securing an internal panel 144 to the enclosure body 104 in the interior thereof. The electrical device or instrument (not shown) can be mounted to the internal panel 144 in the enclosure body 104.

Figure 7:
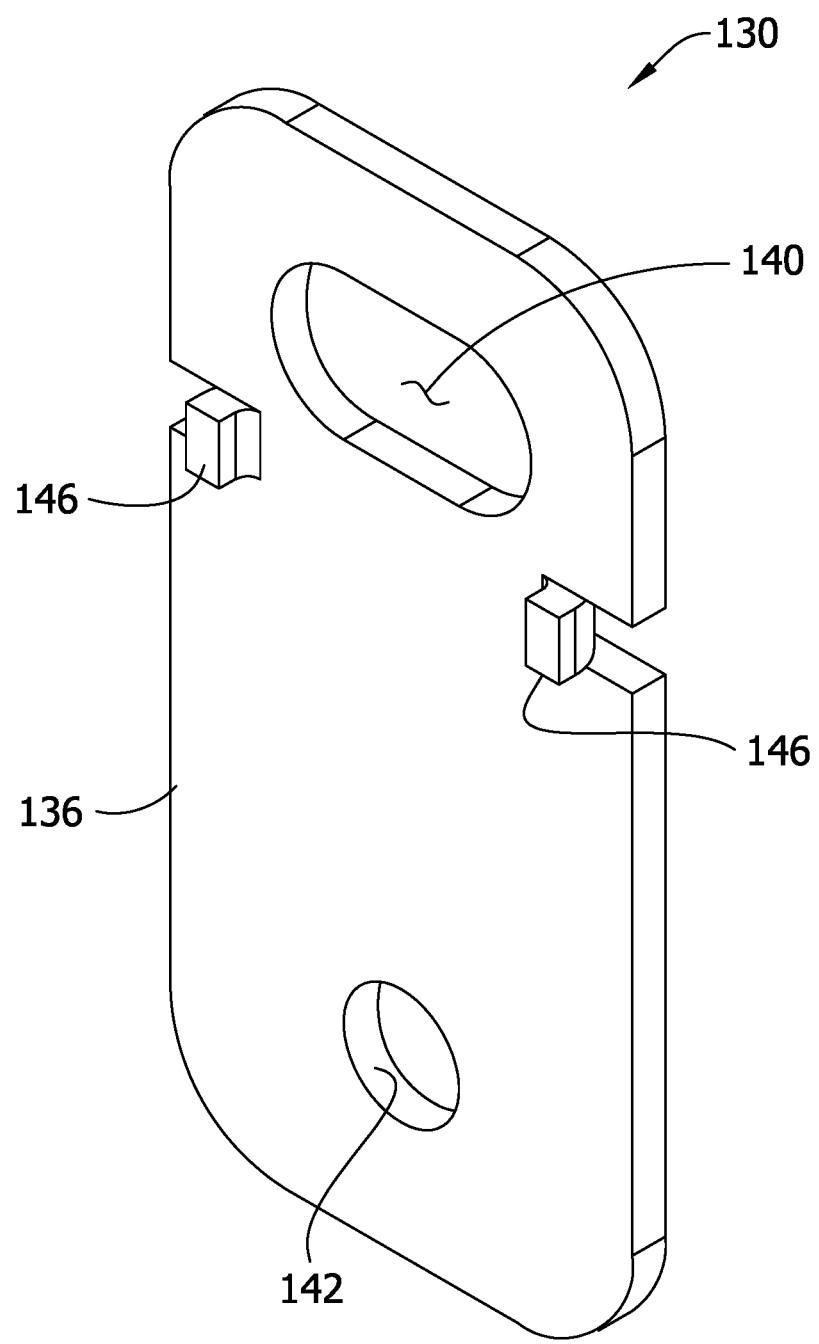
FIG. 7 is an enlarged perspective of one of the mounting feet of the electrical enclosure of FIG. 4.
Figure 8:
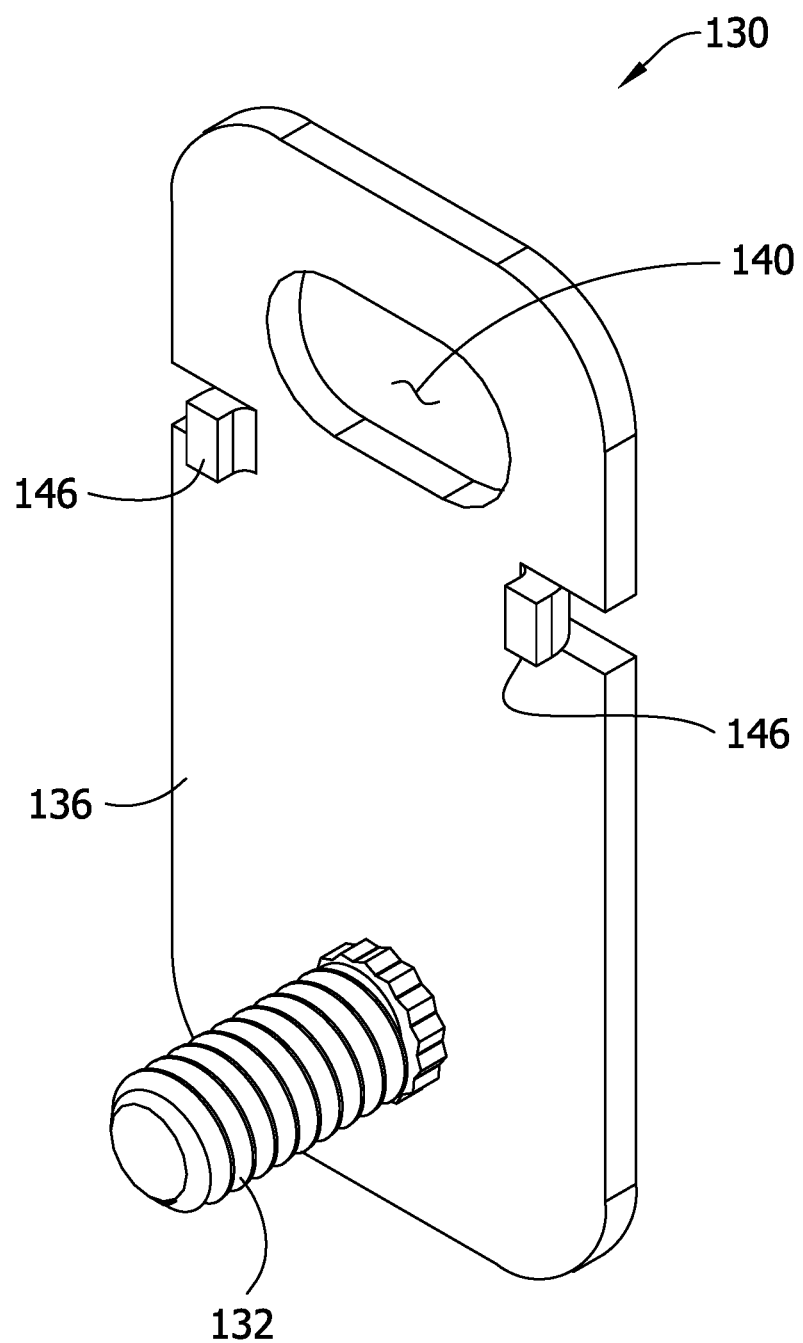
FIG. 8 is similar to FIG. 7, but including a panel fastener received in a panel fastener opening of the mounting foot.
Figure 9:
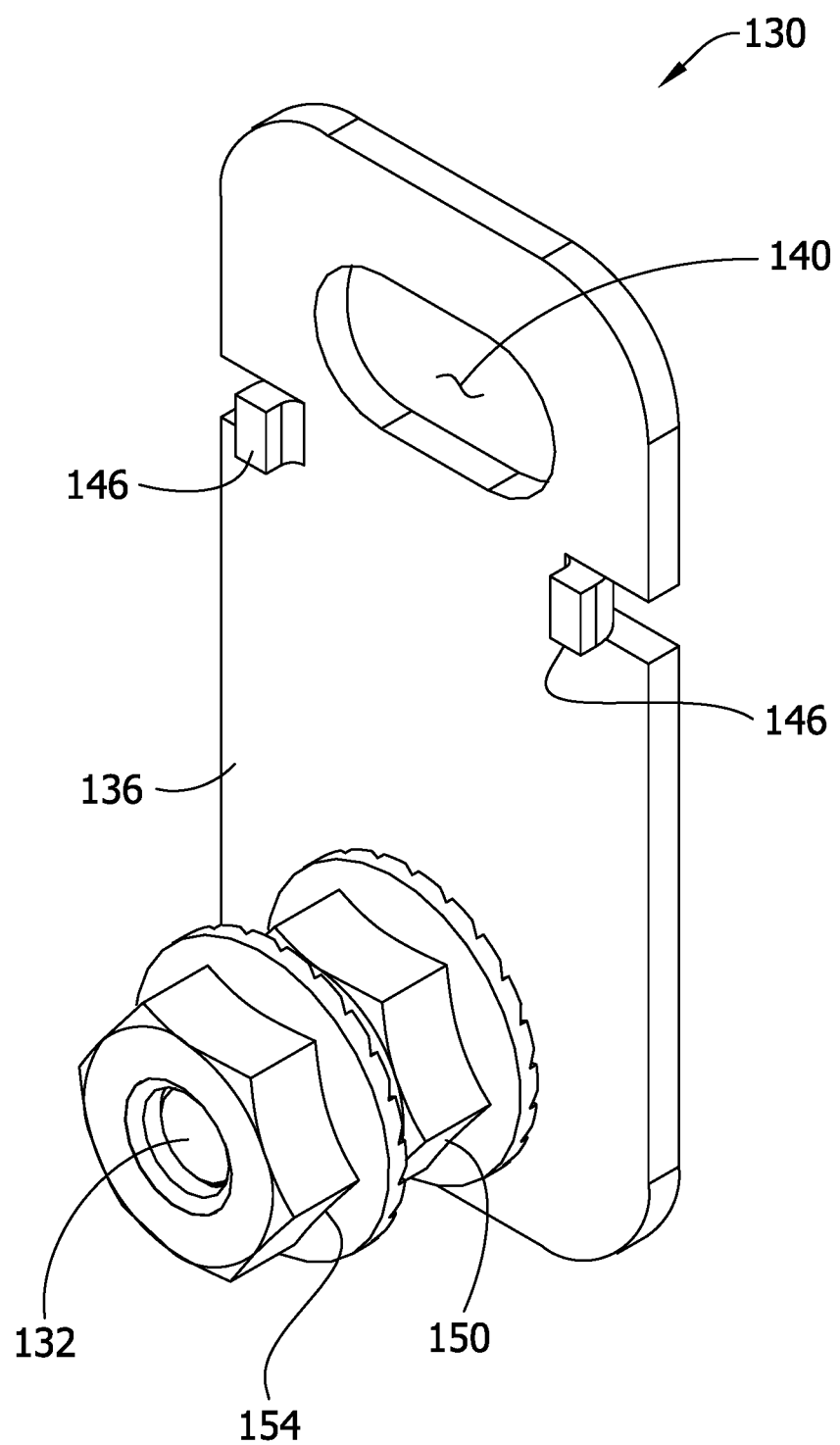
FIG. 9 is similar to FIG. 7, but including a panel spacer and a panel retainer received on the panel fastener.

Each of the mounting feet 130 are substantially identical in structure. Referring to FIG. 7, each mounting foot 130 includes a generally planar body 136 having opposite first and second ends. The planar body 136 defines a mounting fastener opening 140 adjacent the first end, and a panel fastener opening 142 adjacent the second end. The mounting fastener opening 140 is sized and shaped to receive a suitable mounting fastener (e.g., screw or bolt, not shown) therethough to attach the mounting foot 130 to the wall of other support structure. The mounting fastener opening 140 is generally slot shaped, although it may have other shapes and sizes. As shown in FIG. 8, the panel fastener opening 142 is sized and shaped to receive the panel fastener 132 therethrough. It is understood that in other embodiments, the panel fastener opening 142 may be omitted, such as an embodiment where the panel fastener is welded or otherwise attached to the mounting foot (e.g., see FIG. 12). The illustrated mounting foot 130 further includes anti-rotation stops or tabs 146 (e.g., at least one anti-rotation tab) extending outward from a face of the generally planar body 136 adjacent opposite sides of thereof. As explained in more detail below, the anti-rotation tabs 146 inhibit rotation of the mounting foot 130 as the mounting foot (and the internal panel 144) is being secured to the enclosure body 104. It is understood that the anti-rotation tabs 146 may be omitted in other embodiments. Each mounting foot 130 may be formed from metal or other material, and may be integrally formed as a single, monolithic, one-piece component, such as from a single sheet of metal or molding.

Figure 12:
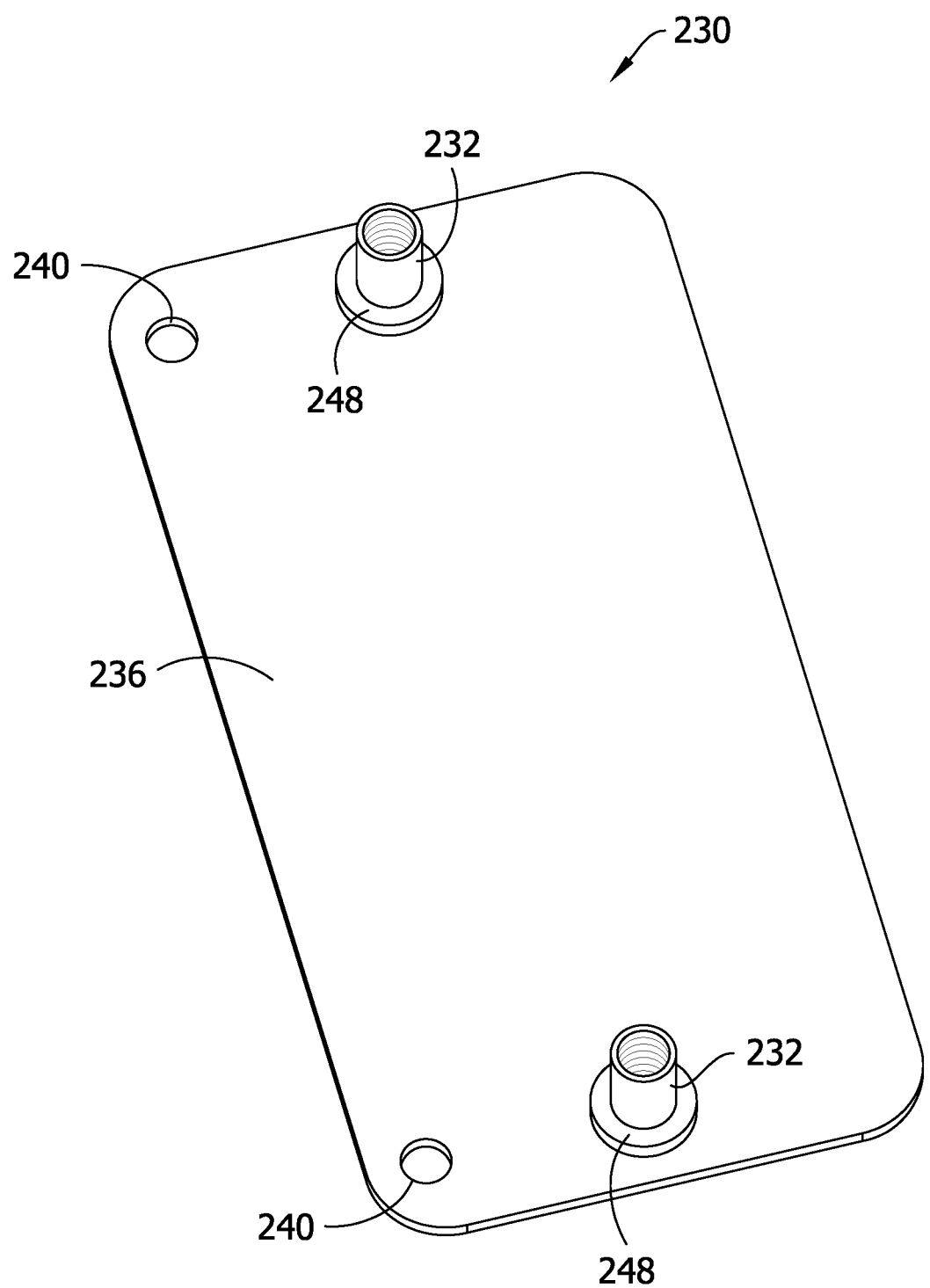
FIG. 12 is front elevational view of another embodiment of a mounting foot constructed according to the teachings of the present disclosure.

The panel fasteners 132 are designed and constructed to be used to secure the internal panel 144 within the enclosure body 104. The illustrated panel fasteners 132 have shafts extending through the openings 142 in the mounting feet 130 and heads opposing the mounting feet. In the illustrated embodiment, the panel fasteners 132 comprise externally threaded fasteners (e.g., stud or bolt or screw or threaded pin) extending from the mounting feet 130, through openings in the back wall 112, and into the interior of the enclosure body 104. In other embodiments, the panel fasteners 132 may comprise an internally threaded stud, such as illustrated in FIG. 12, or other types of fasteners that are used to secure an internal panel within the enclosure body. As explained below, the panel fasteners 132 are also used to fasten the mounting feet 130 to the enclosure body 104, such that the panel fasteners may be considered panel/feet fasteners.

Figure 10:
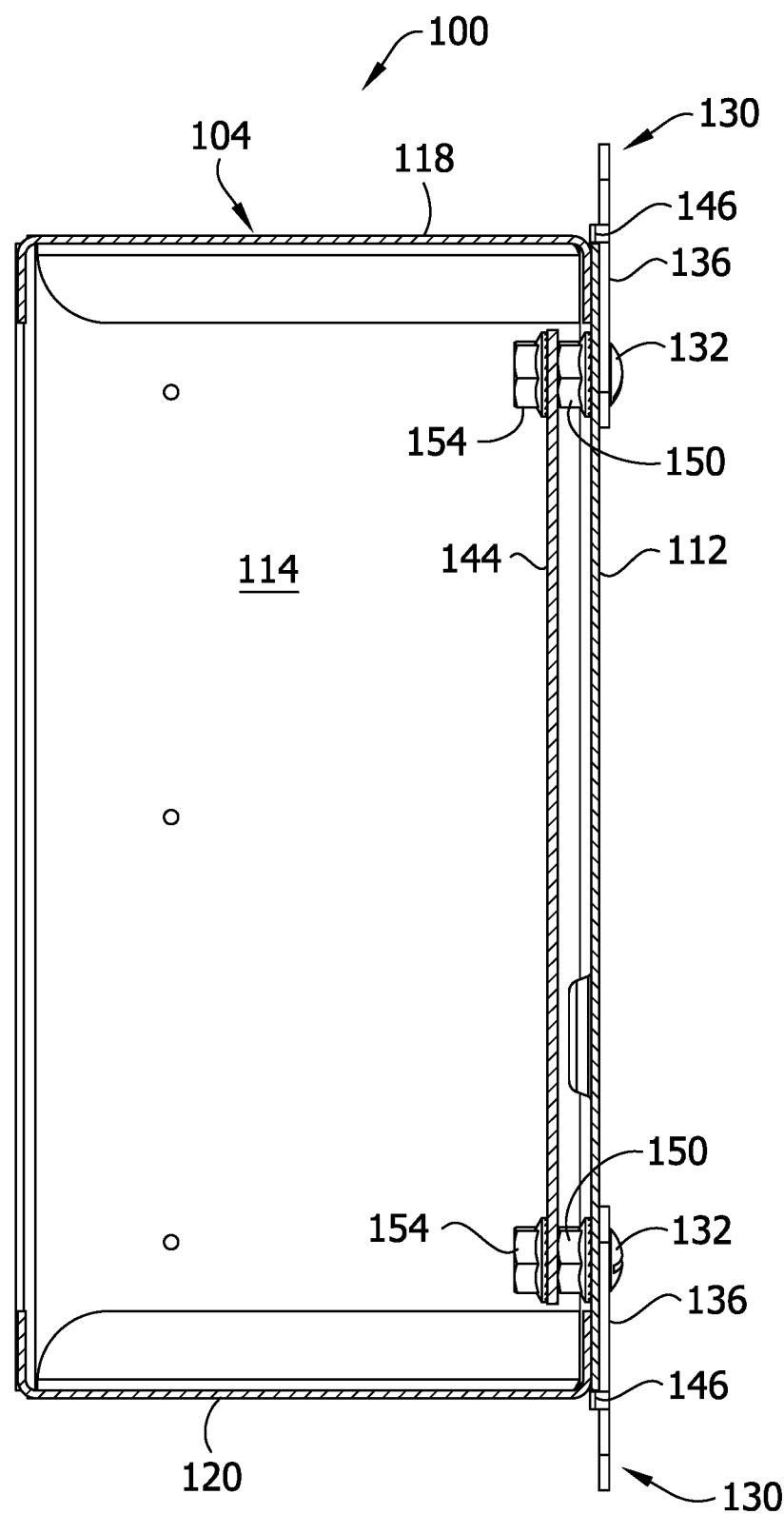
FIG. 10 is a cross section of the electrical enclosure of FIG. 4.
Figure 11:
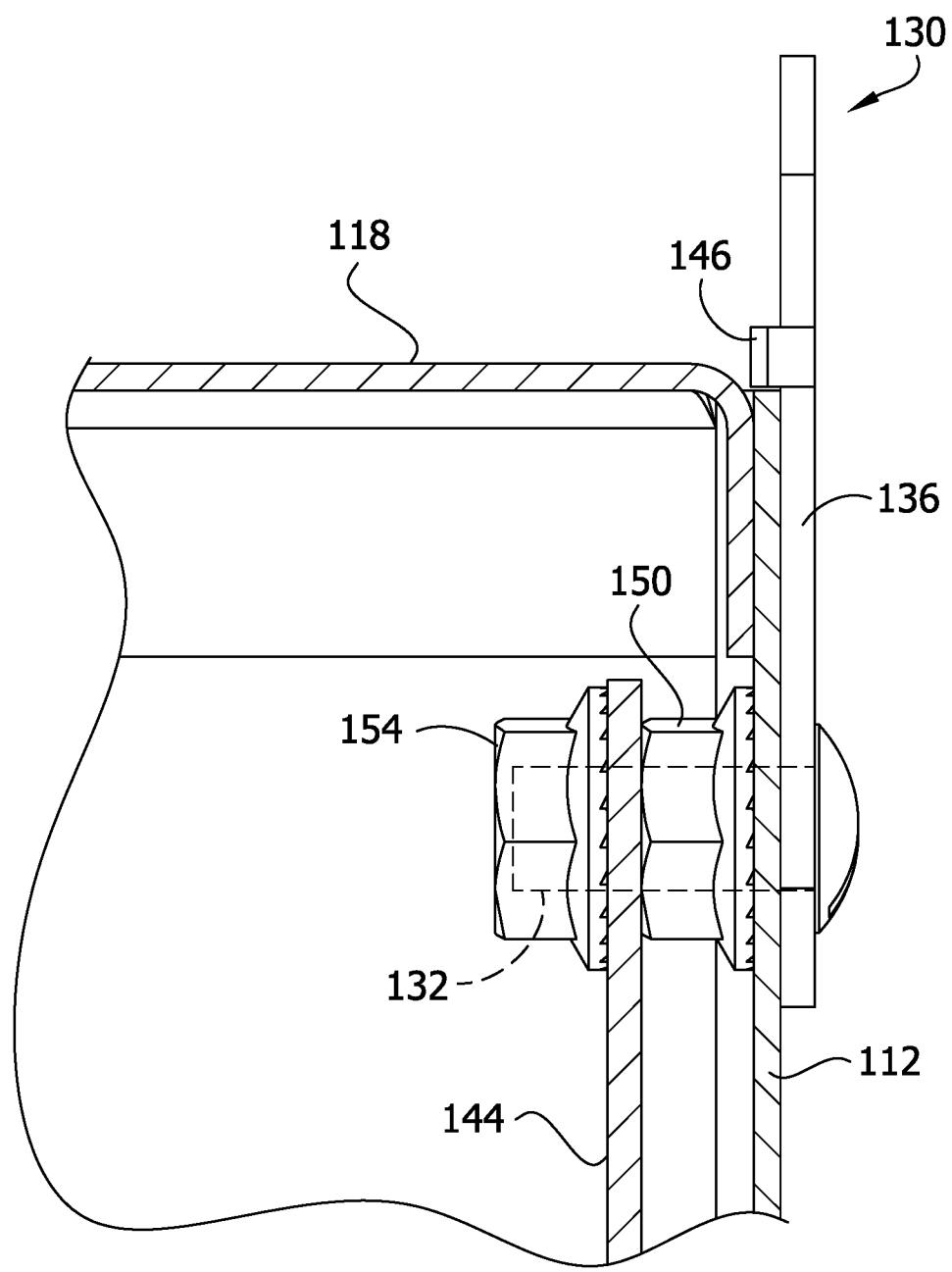
FIG. 11 is an enlarged, detail view of FIG. 10.

The illustrated enclosure/panel mounting system further includes panel spacers 150 on the externally threaded fasteners 132 are disposed between the back wall 112 of the enclosure body 104 and the internal panel 144 to space the internal panel from the back wall. As shown in FIGS. 10-11, the panel spacers 150 engage the back wall 112 of the enclosure body 104 and the panel 144 such that the panel is separated from the back wall by a distance equal to a thickness of the panel spacer. In the illustrated embodiment, the panel spacers 150 comprise internally threaded fasteners (e.g., nuts, such as flanged nuts) threadable on the externally threaded fasteners 132. When tightened on the externally threaded fasteners 132, the internally threaded fasteners 150 also fasten the mounting feet 130 to the enclosure body 104, as can be seen from FIGS. 10 and 11. It is understood that the panel spacers 150 may be of other designs and constructions. Moreover, it is also understood that the electrical enclosure may not include panel spacers that are separate from the panel fasteners, as can be seen from the embodiment illustrated in FIGS. 12-14 and explained below.

In addition, the illustrated enclosure/panel mounting system includes panel retainers 154 secured to the panel fasteners 132 within the enclosure body 104 to secure the panel 144 to the enclosure body. In the illustrated embodiment, the panel 144 is sandwiched or clamped between the panel spacers 150 and the panel retainers 154 on the panel fasteners 132. The panel fasteners 132 extend through openings in the panel 144. The illustrated panel retainers 154 comprise internally threaded fasteners (e.g., nuts, such as flanged nuts) threadable on the externally threaded fasteners 132. When tightened on the externally threaded fasteners 132, the panel retainers 154 may also fasten the mounting feet 130 to the enclosure body 104, as can be seed from FIGS. 10 and 11. It is understood that the panel retainers 154 may be of other designs and constructions. In the illustrated embodiment, the panel spacers 150 and panel retainers 154 are identical. In other embodiments, the panel spacers 150 and panel retainers 154 may not be identical.

In use, the mounting feet 130 may be individually secured to the enclosure body 104 before shipping to the jobsite or at the jobsite by the user. For example, the mounting feet 130 and associated hardware (e.g., the panel fasteners 132, the panel spacers 150, and the panel retainers 154) may be shipped unattached to the remainder of the electrical enclosure 100. Moreover, as shown in FIGS. 5 and 6, the user can orient the mounting feet 130 to extend heightwise (i.e., upward or downward) relative to the enclosure body 104 as shown in the drawings, or laterally (i.e., right or left) relative to the enclosure body as shown in the drawings. For example, in FIG. 5, it can be seen that upper mounting foot 130 adjacent the left wall 114 extends upward, the upper mounting foot adjacent the right wall 116 extends laterally outward (e.g., to the right), the lower mounting foot adjacent the left wall extends downward, and the lower mounting foot adjacent the right wall extends laterally outward (e.g., to the right). This gives the user the ability to choose the mounting orientation of each mounting foot 130 based on its specific application and situation.

To secure each illustrated mounting foot 130 to the enclosure body 104, the mounting foot is positioned in its desired orientation on the exterior of the back wall 112. One of the panel fasteners 132 is inserted through the panel fastener opening 142 of the mounting foot 130, through the aligned corresponding opening in the back wall 112, and into the interior of the enclosure body 104. One of the panel spacers 150 (e.g., the nut in the illustrated embodiment) is threaded on the panel fastener 132 and tightened to secure the mounting foot 130 to the back wall 112. For example, a first tool (e.g., socket wrench or other tool) may be used to grip the panel spacer 150 and a second tool (e.g., a flat head screwdriver or other tool) may be used to turn the head of the panel fastener 132, thus threading the panel spacer onto the fastener.

The anti-rotation tabs 146 inhibit rotation of the mounting foot 130 during threaded of the spacer 150 on the panel fastener 132 by engaging an edge at the back wall 112, as can be seen in FIG. 11. The mounting foot 130 includes two anti-rotation tabs 146 to inhibit rotation of the mounting foot in both the clockwise and counter-clockwise rotational directions—with each anti-rotation tab engaging the enclosure body 104 to inhibit movement in one of the rotational directions. The anti-rotation tabs 146 are spaced apart from the panel fastener 132 by a distance that is equal to a distance between the opening in the back wall 112 and the edge of the enclosure body 104 (e.g., edge margin of the back wall). Accordingly, when the mounting foot 130 is secured to the back wall 112, the anti-rotation tabs 146 engage the edge of the enclosure body 104. As shown in FIG. 6, preferably the openings in the back panel 112 are arranged adjacent to a corner of the back panel and equally spaced from two edges defining the corner so that the anti-rotation tabs 146 engage one of the edges defining the corner regardless of the heightwise or lateral orientation the user mounts the mounting foot 130.

After all of the mounting feet 130 are fastened to the enclosure body 104, the internal panel 144 is received on the panel fasteners 132 such that the panel fasteners extend through aligned openings in the panel. Each panel retainer 154 (e.g., the nut in the illustrated embodiment) is then threaded on the corresponding panel fastener 132 and tightened to sandwich or clamp the panel 144 between the corresponding panel spacer 150 and the panel retainer.

Figure 13:
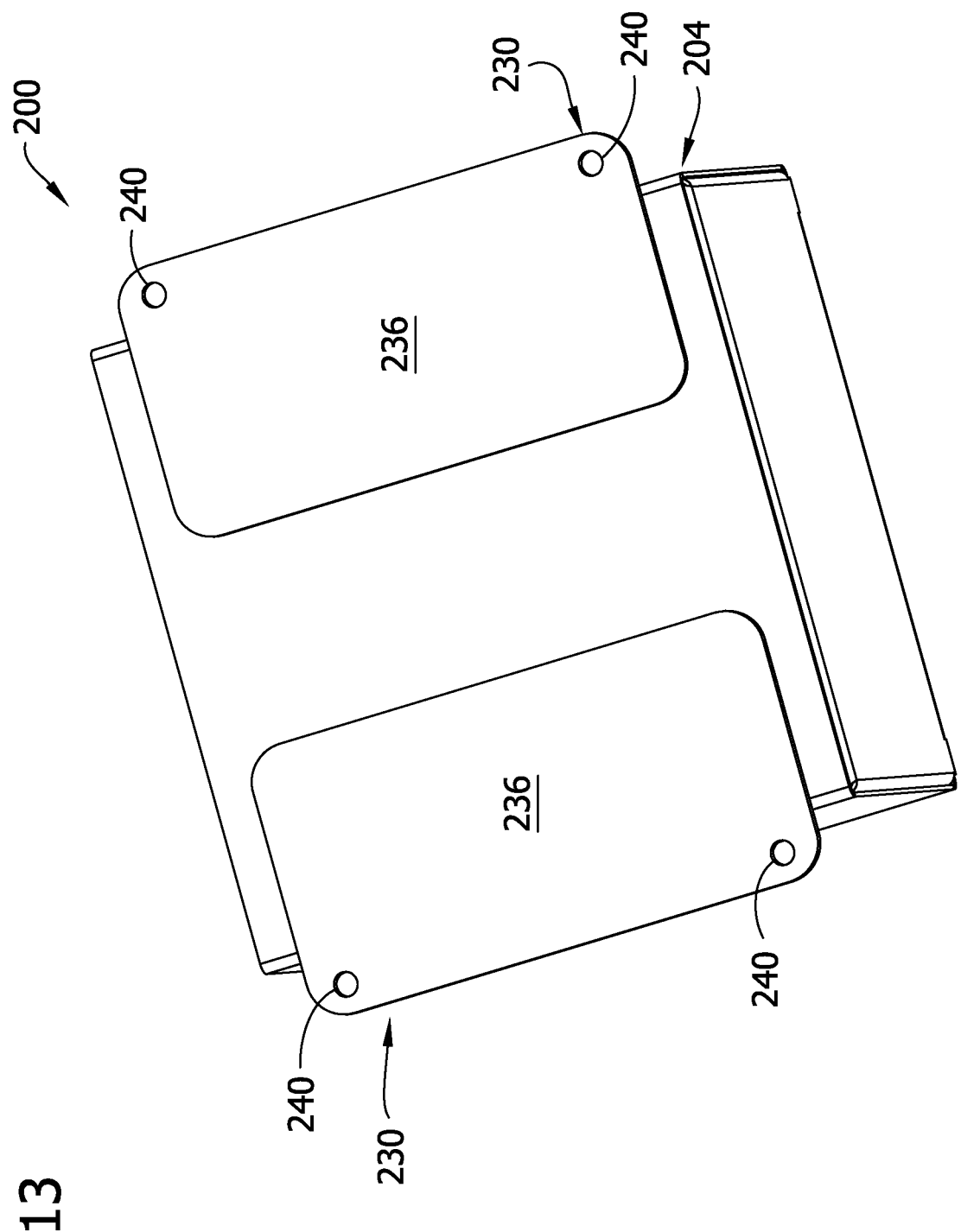
FIG. 13 is a rear elevational view of another embodiment of an electrical enclosure including two of the mounting feet of FIG. 12.
Figure 14:
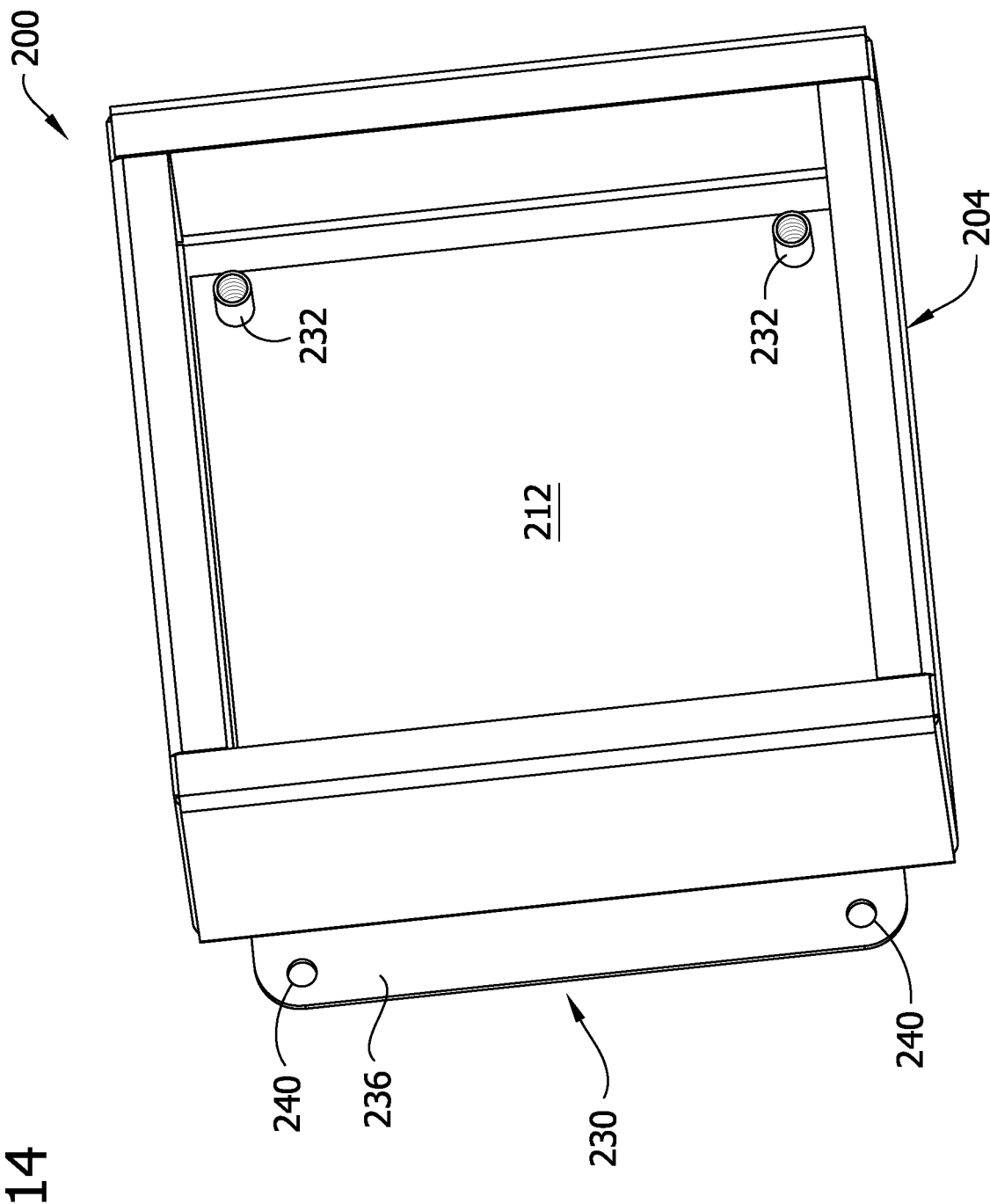
FIG. 14 is a front perspective of the electrical enclosure of FIG. 13.

Referring to FIGS. 12-14, another embodiment of an electrical enclosure 200 is similar to the first electrical enclosure 100 except the present electrical enclosure 200 includes another embodiment of an improved enclosure mounting system and another embodiment of an improved panel mounting system. Thus, for ease of comprehension, where similar parts are used, reference designators "100" units higher are employed. In this embodiment, at least one panel fastener 232 (e.g., two fasteners) extend from each mounting foot 230 and into the interior of the enclosure body 204. Preferably, two panel fasteners 232 are used to inhibit rotation of the mounting foot 230 relative to the enclosure body 204. It is understood that the mounting feet 230 may have the configuration similar to the first embodiments 130. The mounting feet 230 are designed and constructed to be used to secure the enclosure 200 to a wall or other support structure. Each mounting foot 230 includes a generally planar body 236 defining at least one mounting fastener opening 240. The panel fasteners 232 are welded or otherwise attached to the planar body 236. Each illustrated panel fastener 232 comprises a panel mounting stud that is internally threaded (i.e., includes female thread). Retainers 248 (e.g., retaining clips or rings) are secured to the panel fasteners 232 inside the enclosure body 204 to secure the mounting feet 230 to the enclosure body (e.g., the back panel 212 is sandwiched or clamped between the retainers 248 and the planar body 236). It is understood that the mounting feet 230 may be secured to the enclosure body 204 in other ways. For example, in one embodiment, the panel fasteners 232 may be externally threaded and the retainers 248 may be internally threaded so that the retainers may be threaded onto the panel fasteners. An internal panel (not shown) is fastened to the studs 232 in a location spaced apart from the interior of the back wall 212 by extending fasteners (e.g., screws or bolts) through openings in the internal panel and threading the fasteners into the studs (e.g., the internal panel is sandwiched or clamped between a head of the fastener and an end of the stud 232).

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An electrical enclosure for an electrical device or instrument, the electrical enclosure comprising:
   an enclosure body defining an interior sized and shaped to receive the electrical device or instrument, the enclosure body including a back wall;
   a mounting foot outside the enclosure body and attached to the back wall of the enclosure body, the mounting foot including a generally planar body defining a mounting fastener opening configured to receive a fastener to secure the mounting foot to a wall or other support structure;
   a panel fastener attached to and extending forward from the mounting foot, through the back wall, and into the interior of the enclosure body, wherein the panel fastener is configured to be used in securing an internal panel to the enclosure body within the interior of the enclosure body;
   a panel spacer received on the panel fastener in the interior of the enclosure body; and
   a panel secured to the enclosure body by the panel fastener.

2. The electrical enclosure set forth in claim 1, wherein the panel fastener is welded to the generally planar body of the mounting foot.

3. The electrical enclosure set forth in claim 1, wherein the generally planar body of the mounting foot defines at least one panel fastener opening spaced apart from the mounting fastener opening, wherein the panel fastener comprises an externally threaded fastener extending through the panel fastener opening.

4. The electrical enclosure set forth in claim 3, wherein the externally threaded fastener comprises a bolt.

5. The electrical enclosure set forth in claim 1, wherein the panel spacer is threaded on the panel fastener and secures the mounting foot to the back wall of the enclosure body.

6. The electrical enclosure set forth in claim 1, further comprising the internal panel opposing the back wall and located in front of the panel spacer, wherein the internal panel includes a fastener opening, wherein the panel fastener extends through the fastener opening of the internal panel.

7. The electrical enclosure set forth in claim 6, wherein the panel spacer engages the panel and the back wall of the enclosure body such that the panel is separated from the back wall by a distance equal to a thickness of the panel spacer.

8. The electrical enclosure set forth in claim 6, further comprising a panel retainer attached to the panel fastener in front of the panel to secure the panel on the panel retainer between the panel spacer and the panel retainer.

9. The electrical enclosure set forth in claim 8, wherein the panel retainer is threaded on the panel fastener.

10. The electrical enclosure set forth in claim 1, wherein the mounting foot overlaps the back wall of the enclosure body.

11. The electrical enclosure set forth in claim 10, wherein the mounting foot extends past an edge margin of the back wall.

12. The electrical enclosure set forth in claim 10, wherein the mounting foot includes at least one tab engaging the enclosure body to inhibit rotation of the mounting foot relative to the enclosure body.

13. The electrical enclosure set forth in claim 12, wherein the at least one tab engages the back wall.

14. The electrical enclosure set forth in claim 13, wherein the at least one tab comprises two tabs, each tab engaging the back wall to inhibit rotation of the mounting foot relative to the enclosure body.

15. An integrated enclosure/panel mounting system for an electrical enclosure for an electrical device or instrument, the integrated enclosure/panel mounting system comprising:
a mounting foot including a generally planar body defining a planar section and a mounting fastener opening configured to receive a fastener to secure the mounting foot to a wall or other support structure; and
a panel fastener extending from the mounting foot and configured to pass through a back wall of the electrical enclosure and into an interior of the electrical enclosure, wherein the panel fastener is configured to be used in securing an internal panel to the enclosure body within the interior of the electrical enclosure;
wherein the mounting foot defines a panel fastener opening, the mounting fastener opening and the panel fastener opening extending through the planar section of the planar body such that the mounting fastener opening and panel fastener opening extend through the same planar section of the planar body.

16. The integrated enclosure/panel mounting system of claim 15, wherein the generally planar body of the mounting foot defines at least one panel fastener opening spaced apart from the mounting fastener opening, wherein the panel fastener comprises an externally threaded fastener extending through the panel fastener opening.

17. The integrated enclosure/panel mounting system of claim 15, wherein the panel fastener is welded to the generally planar body of the mounting foot.

18. The integrated enclosure/panel mounting system of claim 17, wherein the panel fastener includes internal threads configured to receive an externally threaded fastener.

19. The integrated enclosure/panel mounting system of claim 15, wherein the mounting foot includes at least one tab extending outward from a face of the mounting foot and configured to engage the enclosure body to inhibit rotation of the mounting foot relative to the enclosure body.

* * * * *